United States Patent
Kurosawa et al.

(10) Patent No.: US 6,772,191 B1
(45) Date of Patent: Aug. 3, 2004

(54) SYSTEM AND METHOD FOR LIMITING SERVICES AT A PLURALITY OF LEVELS AND CONTROLLING IMAGE ORIENTATION VIA A NETWORK

(75) Inventors: Takahiro Kurosawa, Kunitachi (JP);
Hiroshi Okazaki, Yokohama (JP);
Toshihiko Fukasawa, Machida (JP);
Kenji Morita, Yokohama (JP);
Kenichiro Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/438,567

(22) Filed: Nov. 10, 1999

(30) Foreign Application Priority Data

Nov. 13, 1998 (JP) .......................................... 10-324221

(51) Int. Cl.[7] .............................. G06F 15/16; H04N 7/15
(52) U.S. Cl. ....................... 709/203; 709/204; 709/217; 705/32; 705/40; 348/15
(58) Field of Search ................................ 709/200, 203, 709/204, 205, 206, 217, 218, 219, 223, 226, 229; 705/32, 40; 725/30, 31, 59, 114, 119; 348/15

(56) References Cited

U.S. PATENT DOCUMENTS

| | | | | |
|---|---|---|---|---|
| 3,886,302 A | * | 5/1975 | Kosco | 380/211 |
| 4,486,773 A | * | 12/1984 | Okubo | 725/2 |
| 5,355,162 A | * | 10/1994 | Yazolino et al. | 725/116 |
| 5,444,476 A | * | 8/1995 | Conway | 348/14.1 |
| 5,675,647 A | * | 10/1997 | Garneau et al. | 380/232 |
| 5,740,075 A | * | 4/1998 | Bigham et al. | 340/825 |
| 5,745,556 A | * | 4/1998 | Ronen | 379/114.01 |
| 5,900,916 A | * | 5/1999 | Pauley | 348/564 |
| 6,018,774 A | * | 1/2000 | Mayle et al. | 709/203 |
| 6,025,868 A | * | 2/2000 | Russo | 725/104 |
| 6,057,884 A | * | 5/2000 | Chen et al. | 348/42 |
| 6,133,941 A | * | 10/2000 | Ono | 348/14.05 |
| 6,133,944 A | * | 10/2000 | Braun et al. | 345/31 |
| 6,157,377 A | * | 12/2000 | Shah-Nazaroff et al. | 345/719 |
| 6,408,128 B1 | * | 6/2002 | Abecassis | 386/125 |
| 6,564,380 B1 | * | 5/2003 | Murphy | 725/86 |

* cited by examiner

*Primary Examiner*—Wen-Tai Lin
(74) *Attorney, Agent, or Firm*—Morgan & Finnegan, LLP

(57) ABSTRACT

An apparatus controlling system capable of providing services such as video services and camera control services via a network, with a simple structure and high efficiency. Upon request from a client, a server for providing video services with camera control services provides a client with limited services (low quality trial services) during the initial stage immediately after connection, in accordance with a connection identifier issued to the client, and upon reception of the connection identifier via a route different from the route via which the services are provided, the server provides the client with limitation relaxed (or released) high quality services in accordance with the returned connection identifier.

29 Claims, 15 Drawing Sheets

SYSTEM AND METHOD FOR LIMITING SERVICES AT A PLURALITY OF LEVELS AND CONTROLLING IMAGE ORIENTATION VIA A NETWORK

BACKGROUND OF THE INVENTION

1. Field of the Invention

The present invention relates to techniques for supplying, for example, images from a camera server at a remote place to a viewer via a network, and more particularly to techniques for providing "trial" services of video services and camera control services which are provided from the camera server to general users on a pay-per-view basis.

2. Related Background Art

With recent developments on computers, the following techniques and systems are provided.

[Video Transmission System with Camera Control Function]

For example, a video transmission system with a camera control function is known which can transmit live moving images taken with a camera having a tripod head capable of panning, titling, zooming and the like to a client machine (terminal equipment such as a personal computer of a user) via a network. With this system, moving images can be supplied to a client machine (this service is hereinafter called "video services") and the quality, size and the like of each image can be dynamically changed (this service is hereinafter called "camera control services"), on a pay-per-view) basis, and trial services thereof are also possible.

[Charging techniques]

In a system for providing services to general users, such as the video transmission system with the camera control function, a charging system (also called "charging infrastructure" where appropriate) for charging the services provided to general users via a network is prevailing.

For example, as such a charging system, "BitCash" of BitCash Corp, "WebMoney" of ASG (ASCII Something Good) Corp, "millicent" of DEC Corp and the like are known.

[Trial Use of Software]

There is software (trial software such as product software and shareware) which is distributed to general users via various media such as a CD-ROM as a supplement to a magazine and the Internet and allows the users to try it with no charge. Some of such trial software limits the trial period, for example, allows to try it for one week. For example, the compression/expansion software "WinZip" limits the trial period. The monitor image capturing software "HyperSnap-DX" allows to try it with a limited function.

There is chargeable trial software which allows to be installed and tried with a partially limited function thereof. If a user wishes to install and try in a perfect state or wishes to receive perfect services, the user purchases key information (ticket information) via a charging infrastructure to install the software without the function limitation.

[Packet Filtering]

A router interconnecting networks and firewall software for preventing external invasion are provided with a function of filtering each packet on the network in accordance with its attribute such as a header of IP (Internet Protocol) and a header of TCP (Transmission Control Protocol).

For example, "RT801" of YAMAHA Co. is provided with such a function as a router, and "Firewall-1" of CheckPoint Corp is provided with such a function as firewall software.

However, for example, in a video transmission system with a camera control function, if trials of the camera control services and video services are permitted to general users and such services are provided in a perfect state to general users by issuing tickets by using complicated ciphering means and apparatus, then the system configuration becomes complicated because of ticket issuance and management, and a large amount of developments and running cost are required.

SUMMARY OF THE INVENTION

The invention has been made in order to solve the above problems and aims to provide an apparatus controlling system, a terminal equipment, a network system, a network control method, and a computer readable storage medium storing program steps for realizing the method, capable of realizing services such as video services and camera control services by using a network, with a simple structure and high efficiency.

In order to achieve the above object of the invention, an embodiment provides an apparatus controlling system for providing a service requested client with services via a network, the services including at least for data acquired by the apparatus having a predetermined function of controlling an operation of the apparatus via the network or for an operation of the apparatus, the apparatus control system comprising: connection identifier issuing means for issuing a connection identifier for identifying the client, to the client; service limiting means for limiting the services to be provided to the client, in accordance with the connection identifier issued by the connection identifier issuing means; and service quality changing means for changing a limitation of the services limited by the service limiting means, in accordance with the connection identifier, if the connection identifier issued to the client by the connection identifier issuing means is transmitted via a predetermined transmission side.

Another embodiment provides a terminal equipment at a client connected to a same network as a server for providing services to the terminal equipment via the network when the terminal equipment issues a service request to the server, the services including at least for data acquired by an apparatus having a predetermined function of controlling an operation of the apparatus via the network or for an operation of the apparatus, the terminal equipment comprising: connection identifier receiving means for receiving a connection identifier for identifying the terminal equipment from the server; service receiving means for receiving services limited in accordance with the connection identifier received by the connection identifier receiving means; and connection identifier transmitting means for transmitting the connection identifier received by the connection identifier receiving means to the server via a predetermined transmission side on the same network, wherein the service receiving means receives the services limited in accordance with the connection identifier transmitted by the connection identifier transmitting means via the predetermined transmission side, by changing the limitation of the services.

Another embodiment provides a network system including at least a terminal equipment at a server having a predetermined function capable of controlling an operation thereof via a network and a terminal equipment at a client connected to the same network as the server, the server responsive to a request from the client providing the client with services including at least for data or for the operation acquired by the predetermined function, wherein:

the terminal equipment at the server has functions of the apparatus controlling system recited in the first embodiment;

and the terminal equipment at the client has functions of the terminal equipment recited in the second embodiment.

Another embodiment provides a control method for a network system including at least a terminal equipment at a server having a predetermined function capable of controlling an operation thereof via a network and a terminal equipment at a client connected to the same network as the server, the server responsive to a request from the client providing the client with services including at least for data or for the operation acquired by the predetermined function, the control method comprising: a connection identifier issuing step in which the server issues a connection identifier for identifying the client, to the client; a service limiting step in which the server limits the services to be provided to the client, in accordance with the connection identifier issued by the connection identifier issuing step; a connection identifier transmitting step in which the client transmits the connection identifier issued by the connection identifier issuing step, to the server via a predetermined transmission side on the same network; and a service quality changing step in which the server changes a limitation of the services limited by the service limiting step, in accordance with the connection identifier transmitted by the connection identifier transmitting step.

The invention will be described more specifically. A camera server having a camera capable of the control of zooming, panning, tilting and the like is provided with means for issuing a connection identifier for identifying a client which requested services via a network, means for providing only limited services to the client, and means for receiving a connection identifier from the client, and the client is provided with means for receiving a connection identifier issued from the camera server.

As the client issues a request of video services and camera control services to the camera server, the camera server supplies the client with the connection identifier to be allocated to the client. The client is provided with limited services in accordance with the connection identifier.

The connection identifier contains information on client identification and information on service quality (limitation degree which is also called "service level" where appropriate). For example, the service level is managed at two levels or at multiple levels in accordance with some of the following service limitations or combinations thereof:

limitation is applied to an image quality:

limitation is applied to an image frame rate;

limitation is applied to an access time to image data (video services) and camera control (camera control services;

limitation is applied to a range of the camera control;

another image pattern is synthesized on a provided image;

an original image mosaic-processed is used as the image pattern;

a telop representative of "under trial" is used as the image pattern;

the synthesizing position and size of the image pattern are set randomly;

the synthesizing position and size of the image patter are changed with time; and the synthesizing position and size of the image patter are changed with a camera control parameter.

As the services limited as described above are provided to the client, image data corresponding to the limited services is displayed on the viewer of the client. The limited camera control can be performed by the viewer via the network. Namely, in the initial stage immediately after the connection between the client and camera server, a "trial connection" is enabled so that low quality services are provided to the client.

If the client wishes to receive high quality services, the client pays a predetermined fee to a charging server on the network, and returns the connection identifier received from the camera server to the camera server via the charging server. In this case, in order to improve security, the connection identifier is returned via a second route different from a first route via which the services are provided. For example, the second route may be a serial line of a computer running at the camera server, a telephone line with a transmitter number notice function, or the like.

Upon reception of the connection identifier, the camera server provides the limitation released (or relaxed) high quality services to the connected client which returned the connection identifier via the second route.

The route along which the connection identifier is transmitted to the camera server via the charging server may be the same physical route as the route via which the services are provided. In this case, in order to improve security, the camera server is provided with, for example, packet filtering means for filtering packets in accordance with an attribute of a communication packet. By using this packet filtering means, packets may be filtered by using a transmission side address as a key, or by using the address of the charging server registered in advance.

If the camera server is constituted of a camera control server for controlling the camera and a video server for delivering image data, means for issuing the connection identifier may be provided either to the video server or to the camera control server, or may be provided to both the servers to perform an arbitration operation for retaining the integrity of the connection identifier.

Other objects and features of the present invention will become apparent from the following detailed description of embodiments when read in conjunction with the following drawings.

DETAILED DESCRIPTION OF THE PREFERRED EMBODIMENTS

Preferred embodiments of the invention will be detailed with reference to the accompanying drawings.

(First Embodiment)

Figure 1:
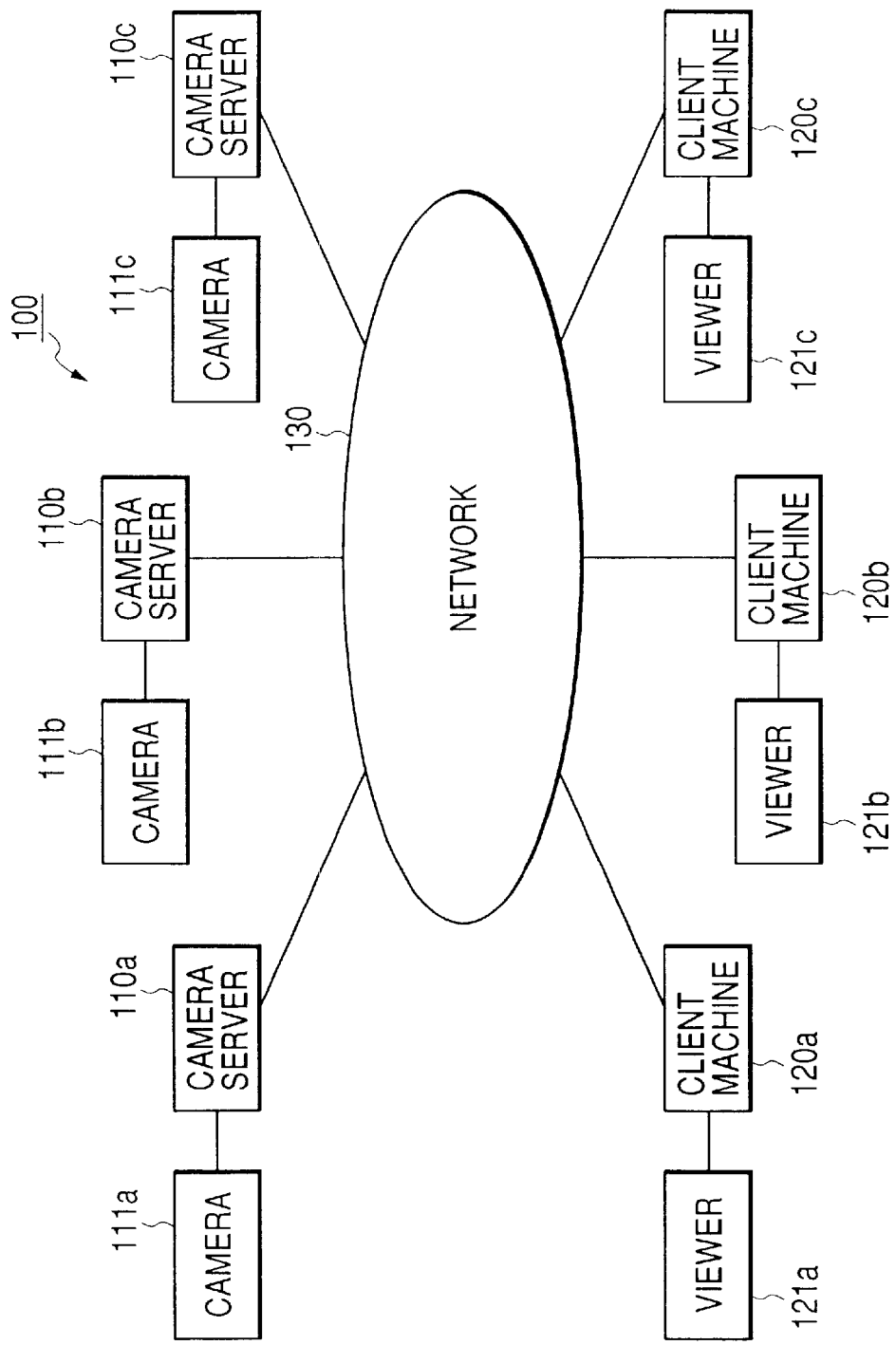
FIG. 1 is a block diagram showing the structure of a video transmission system with a camera control function according to a first embodiment of the invention.

This invention is applied, for example, to a video transmission system 100 with a camera control function shown in FIG. 1.

This system includes a plurality of camera servers 110a, 110b, 110c, . . . and a plurality of client machines 120a, 120b, 120c, . . . all connected by a network 120.

Each of the camera servers 110a, 110b, 110c, . . . can provide camera control services and video services to each of the client machines 120a, 120b, 120c . . . .

The camera servers 110a, 110b, 110c, . . . are provided with cameras 111a, 111b, 111c, . . . , respectively, and in response to a request supplied via the network 130, transmit image data obtained by the cameras 111a, 111b, 111c, . . . and control the cameras 111a, 111b, 111c, . . . such as zooming, panning, tilting and the like.

The client machines 120a, 120b, 120c, . . . are personal computers of general users and are provided with displays 110a, 110b, 110c, . . . with viewers, respectively. Image data acquired after a request is transmitted to each of the camera servers 110a, 110b, 110c, . . . is displayed and monitored on the displays 121a, 121b, 121c.

For example, when a request of video services is transmitted from the client machine 120a to the camera server 110a via the network 130 and the request is received by the camera server 110a, image data picked up with the camera 111a of the camera server 110a is transmitted (distributed) to the client machine 120a and displayed on the display 121a of the client machine 120a by using the viewer 121a. When a request of camera control services is transmitted from the client machine 120a to the camera server 110a via the network 130 and the request is received by the camera server 110a, the client machine 120a can manipulate the camera 111a of the camera server 110a to make it zoom, pan, tilt or the like.

In the following description, the system 100 is assumed to allow a trial of chargeable "video services with a controllable camera" via the network and invalidate a zooming operation as the trial service limitation.

It is also assumed that this service limitation is released when a predetermined fee is paid for the services.

For the simplicity of the description, the services with the limitation are called "low quality services" and the services without the limitation are called "high quality services".

Since the camera servers 110a, 110b, 110c, . . . have the same structure, the operation and the like of the camera server 110a only will be described by way of example. Similarly, of the client machines 120a, 120b, 120c, the operation and the like of the client machine 120a only will be described by way of example.

The network 130 may be an intranetwork used by enterprises or associations or the worldwide Internet.

The system 100 of the embodiment will be described specifically.

Figure 2:
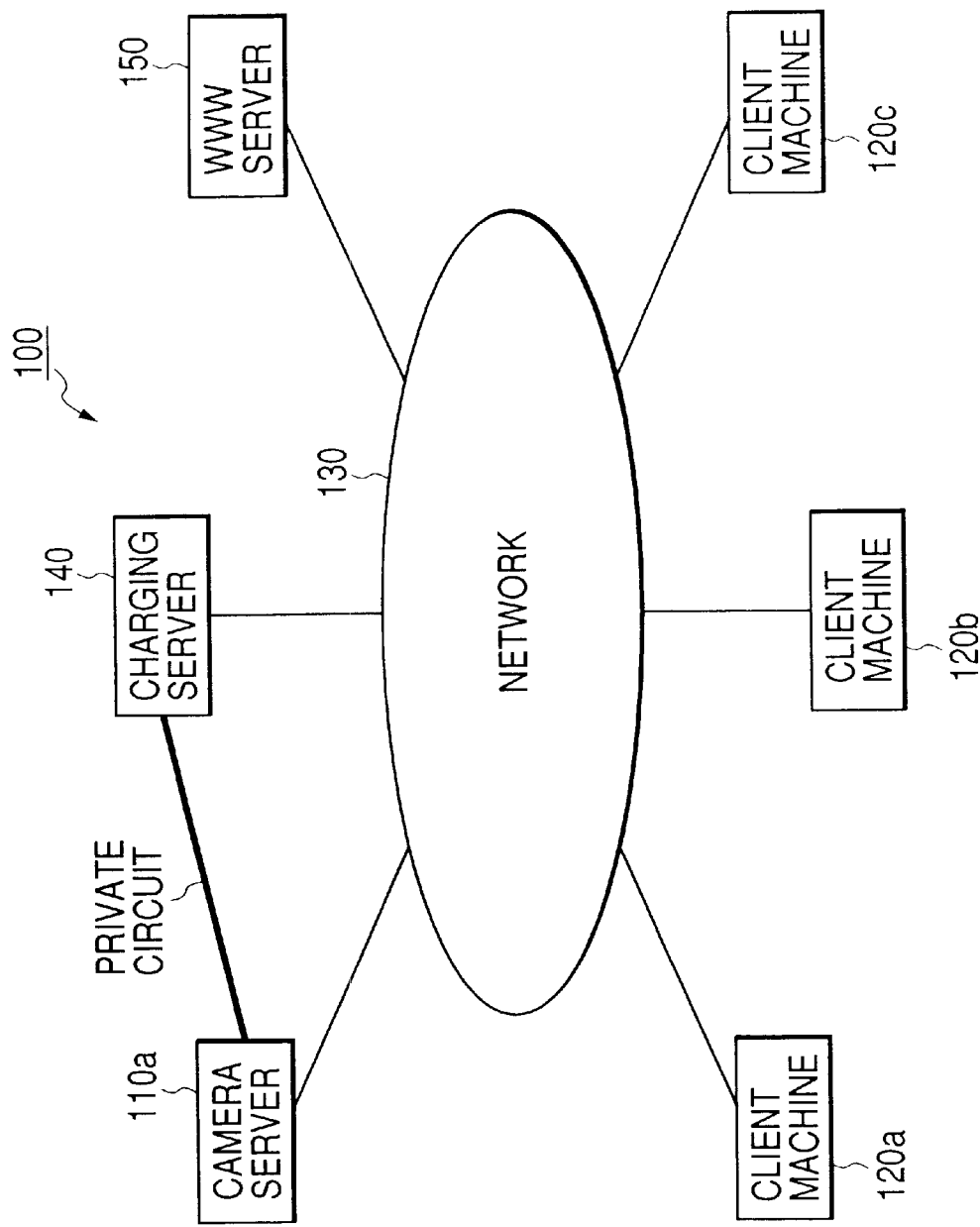
FIG. 2 is a block diagram illustrating the use state of the system.

In this system 100, in order to charge the video services and camera control services provided by the camera server 110a, a charging server 140 of the charging infrastructure is also connected to the network 130, as shown in FIG. 2.

Also in this system 100, since Web techniques prevailing together with the charging infrastructure are utilized, a WWW (World Wide Web) server 150 is also connected to the network 130.

In this system 100, it is assumed that there are two logical routes, a first route for transmission/reception of services such as video services and camera control services and a second route for receiving an already charged connection identifier from the charging server 140. In this embodiment, as these routes, physically different communication media are used.

Specifically, as the first route, a general network connection via the Internet is used (refer to a thin line in FIG. 2), whereas as the second route, a private circuit connected to the charging server (charging infrastructure server) 140 is used (refer to a bold line in FIG. 2).

For example, the charging server 140 uses "BitCash". Namely, the charging server 140 in this embodiment means a "BitCash" charging server. Therefore, as viewed from the charging server 140, the camera servers 110a, 110b, 110c, . . . of the system 100 correspond to shops under the management of the charging server 140.

The WWW server 150 stores a link to an address of the camera server 110a in its Web page so that the client machine 120a can be easily connected to the camera server 110a.

Figure 3:
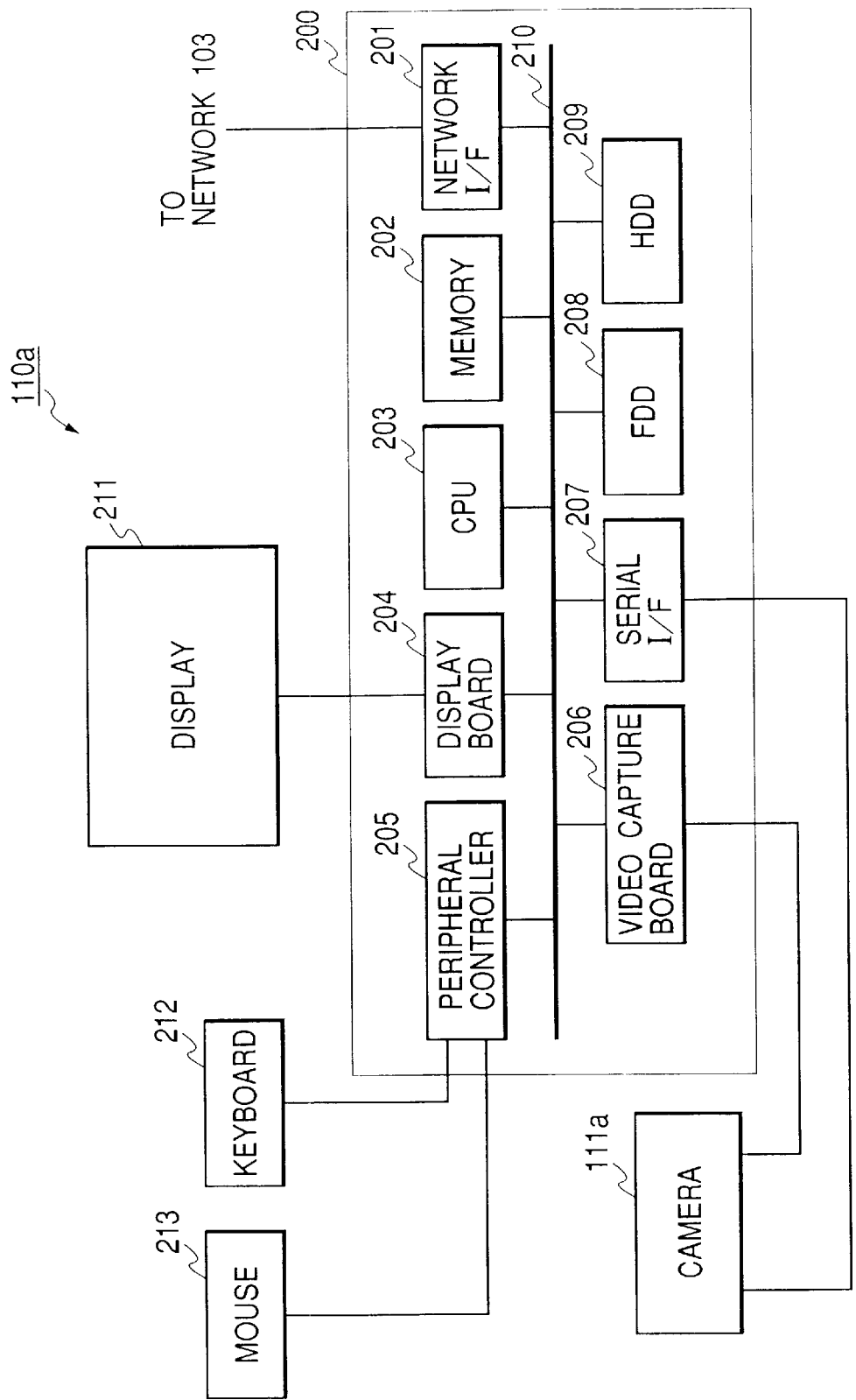
FIG. 3 is a block diagram showing the hardware structure of a camera server of the system.

FIG. 3 shows an example of the hardware structure of the camera server 111a.

As shown in FIG. 3, the camera server 110a has: a computer 200; and a display 211, a keyboard 212, a mouse 213 and a camera 111a (refer to FIG. 1) all connected to the computer 200.

The computer 200 includes: a network I/F 201 for interfacing with the network 130: a memory 202 used as a working memory for storing various data and programs to be described later; a CPU 203 for controlling the whole operation of the camera server 110a by executing the programs in the memory 202 and other operations; a display board 204 for the display 211; a peripheral controller 205 for the mouse 213, keyboard 212 and the like; a video capturing board for capturing image data picked up with the camera 111a; a serial I/F for interfacing with the camera 111a to send a command to the camera; an FDD 208 to be used for loading the program from a storage medium; and an HDD 209 for driving a hard disk storing programs for various operation controls by CPU 203, all connected via a bus 210.

Figure 4:
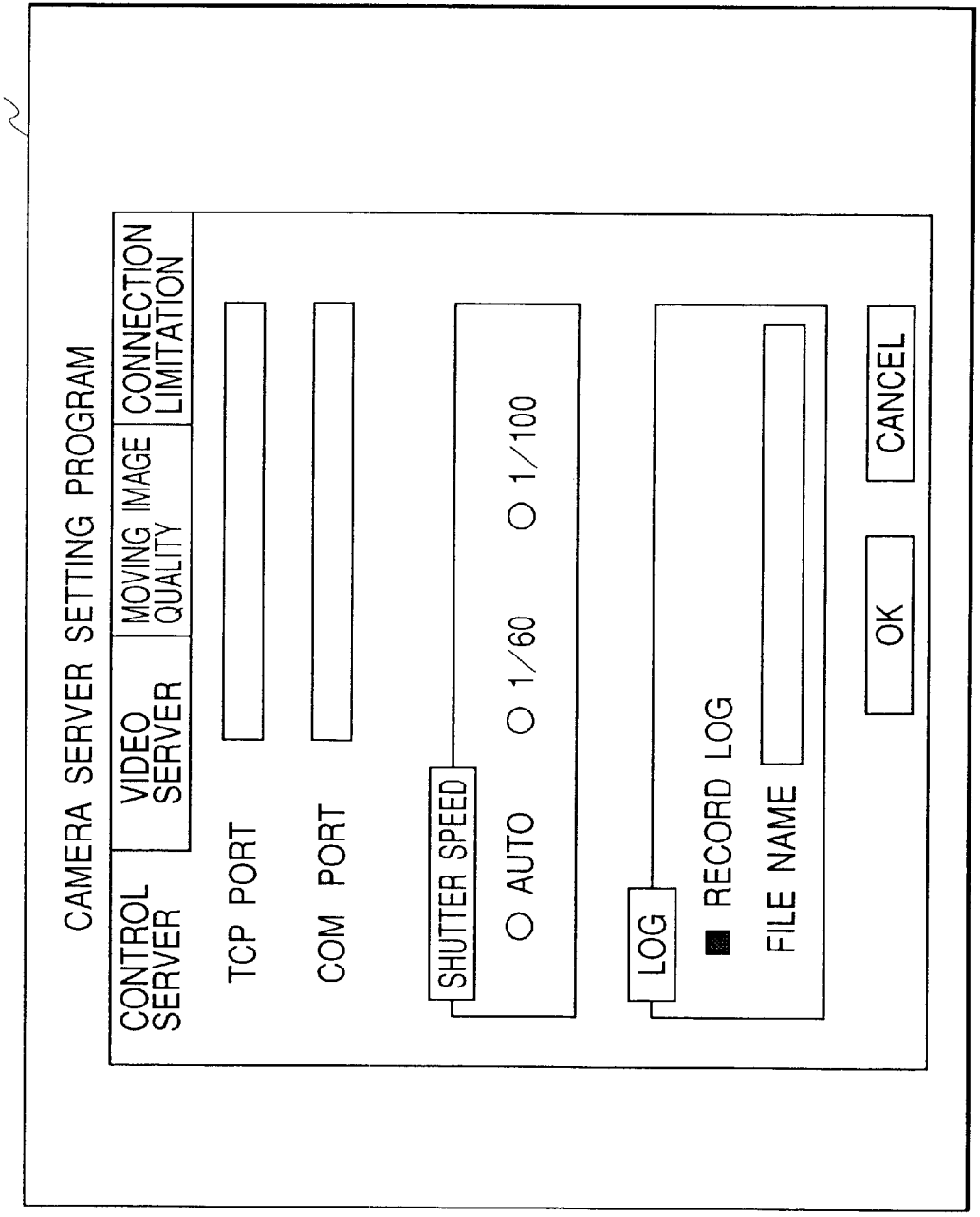
FIG. 4 is a diagram showing the display screen for setting operation information of the camera server.

FIG. 4 is a diagram showing a camera server setting program screen displayed on the display 211.

The camera server setting program is used when various setting values to be used by the camera server 110a are written in a special file (e.g., a system database such as a registry, depending upon the type of an OS).

Although the details will be given later, the camera server setting program can set various parameters of the camera 111a such as a moving image quality and a connection limitation item for the low quality services. When an "OK" button is clicked after various parameters are set, the set parameters are. written in the special file or registry, whereas when a "CANCEL" button is clicked, the set parameters are not written in the special file or registry.

Figure 5:
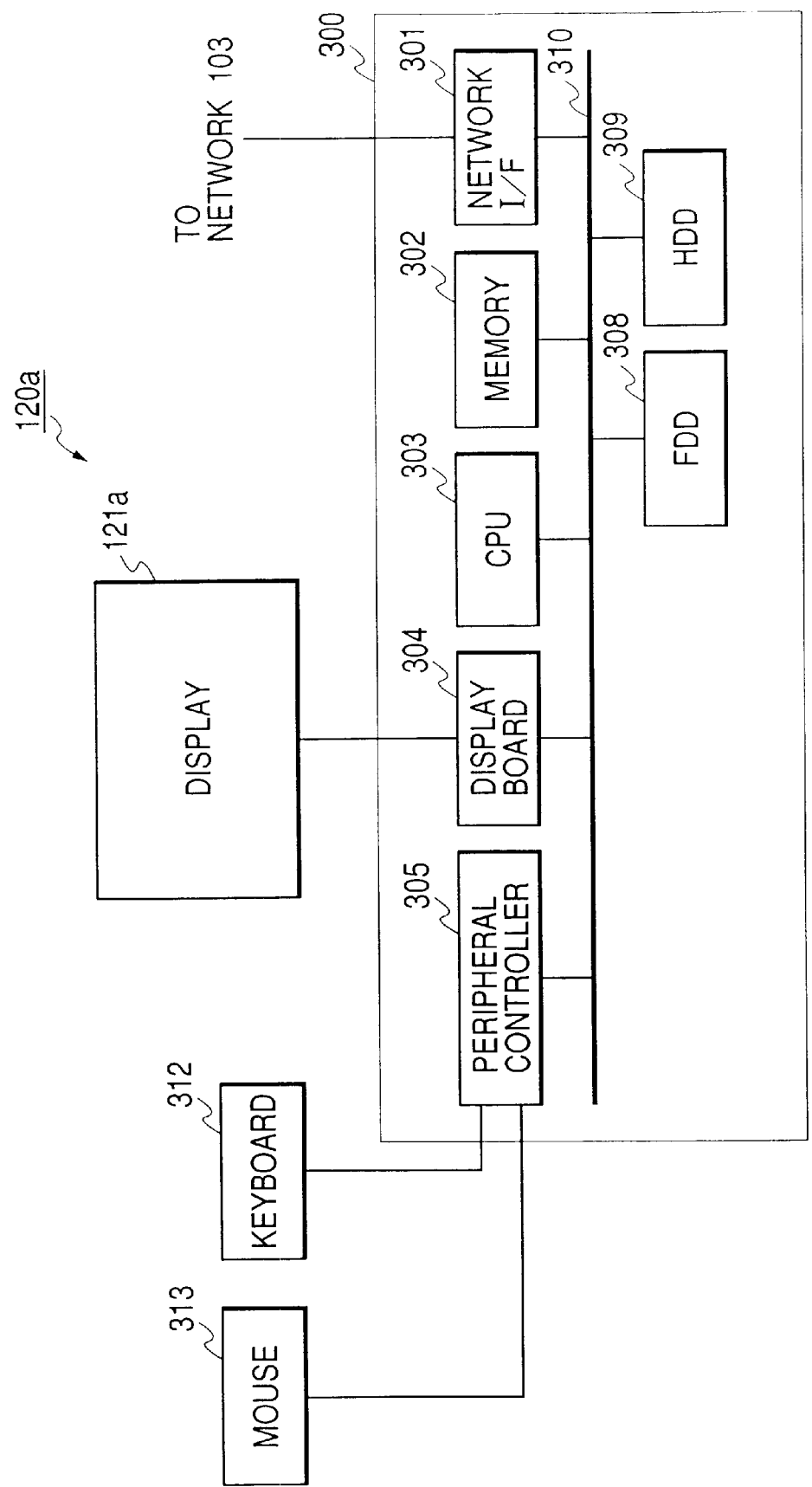
FIG. 5 is a block diagram showing the hardware structure of a client machine of the system.

FIG. 5 shows an example of the hardware structure of the client machine 120a. As shown in FIG. 5, the client machine 120a has: a computer 300; and a display 121a (refer to FIG. 1), a keyboard 312 and a mouse 313 all connected to the computer 300.

The computer 300 includes: a network I/F 301 for interfacing with the network 130: a memory 302 used as a working memory for storing various data and programs to be described later; a CPU 303 for controlling the whole operation of the client machine 120a by executing the programs in the memory 302 and other operations; a display board 304 for the display 121a; a peripheral controller 305 for the mouse 313, keyboard 312 and the like; an FDD 308 to be used for loading the program from a storage medium; and an HDD 309 for driving a hard disk storing programs for various operation controls by CPU 303, all connected via a bus 310.

Figure 6:
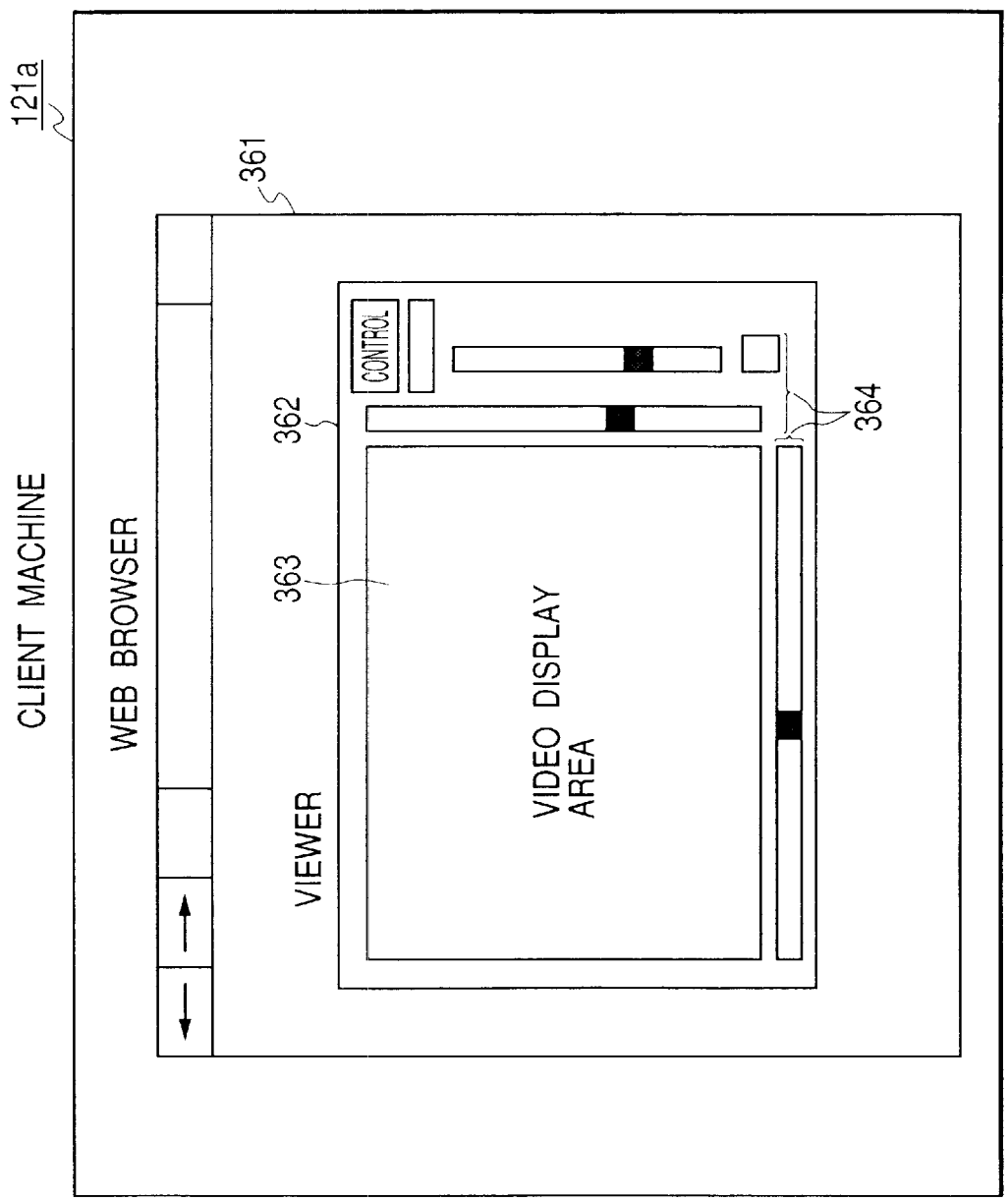
FIG. 6 is a diagram showing a viewer screen of the client machine.

FIG. 6 shows a screen of the display 121a of the client machine while a viewer program runs.

Reference numeral 361 represents an image displayed by a Web browser program such as "Navigator" of Netscape Corp and "Internet Explorer" of Microsoft Corp.

Reference numeral 362 represents an image displayed by a viewer program, i.e., GUI (Graphic User Interface) operable in the display area given by the Web browser program. This image displayed by the viewer program 362 contains a video display area 363 and an operation area 364 including a scroll bar for panning (horizontal motion of the camera), a scroll bar for tilting (vertical motion of the camera), a scroll bar for zooming, a button for requesting a camera control privilege, an area for displaying the state of the camera control privilege, a rear light correction button and the like.

For example, under the control of the Web browser program, video data supplied from the camera server 110a is displayed in the video display area 363, and a user instruction entered from the operation area is transmitted to the camera server 110a.

Figure 7:
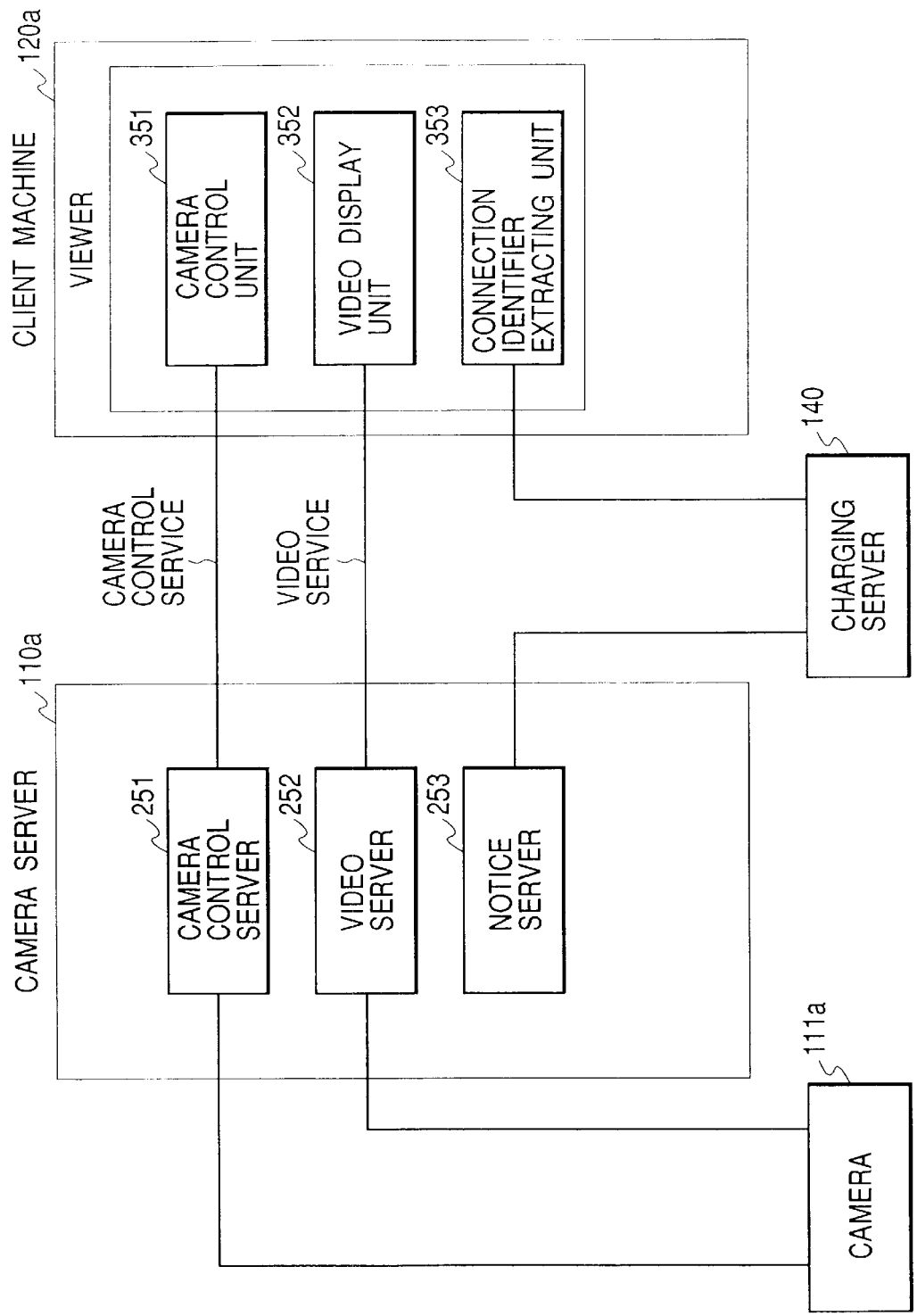
FIG. 7 is a block diagram showing the software structure of the system.

FIG. 7 is a schematic block diagram illustrating the program operation of providing the chargeable video services and camera control services from the camera server 110a to the client machine 120a.

As shown in FIG. 7, the camera server 110a includes: a camera control server 251 for controlling the operation of the camera 111a; a video server 252 for delivering video data picked up with the camera; and a notice server 253 for instructing the video server 252 and camera control server 251 to release the service limitation of the trial connection corresponding to a connection identifier to be described later, after the notice server 253 receives the connection identifier via a route different from the route for the video server 252 and camera control server 251.

The viewer program 362 for the display 121a of the client machine 120a includes: a camera control unit 351 for instructing the operation control of the camera 111a of the camera server 110a and for dealing with the state notice from the camera server 110a; a video display unit 352 for controlling the display of video data distributed from the camera server 110a; and a connection identifier extracting unit for extracting a connection identifier.

The charging server 140 has a function of paying a collected fee to the camera server 110a which operates as a shop of the charging server 140 and a function of notifying the camera server 110a of a charging success if it occurs.

Figure 8:
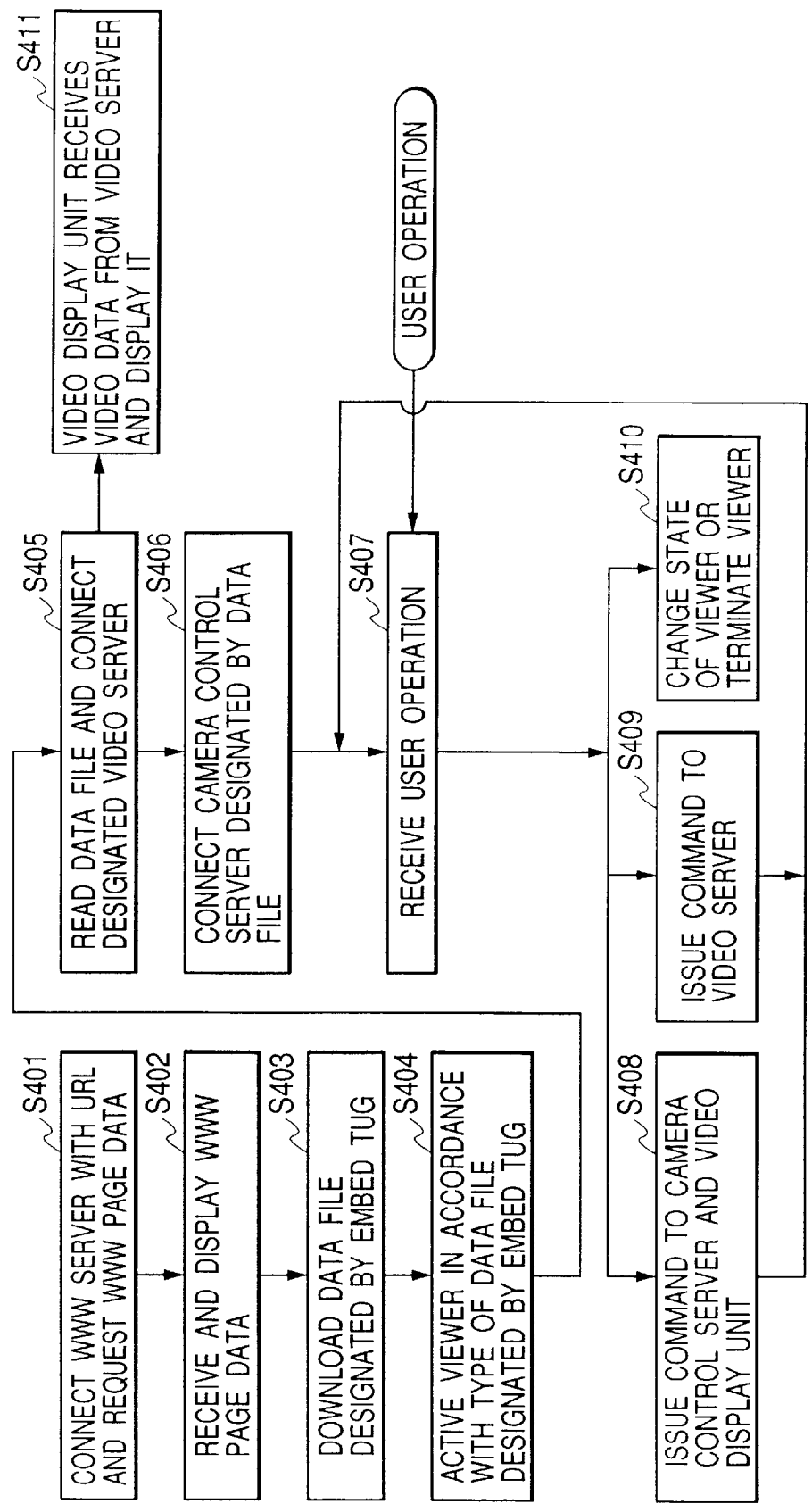
FIG. 8 is a flow chart illustrating the operation of the client machine.

FIG. 8 is a flow chart illustrating the operation to be executed by the client machine, particularly the operation to be executed when limited low quality services (trial connection) are to be received.

Step S401:
First, a user of the client machine 120a designates a WWW server (WWW server 150) by entering an URL (Uniform Resource Locator) from the keyboard 312 and mouse 313. The Web browser program 361 (refer to FIG. 6) operates to connect the WWW server 150 corresponding to URL designated by the user, and to request the Web page data described by a HTML (Hyper Text Markup Language) format from the WWW server 150 via the network 130.

Step S402:
Upon reception of the Web page data from the WWW server 150, the Web browser program 361 displays the Web page data on the display 121a.

The Web page data contains the following embed tag (or hyper link) representative of the information necessary for activating the viewer program 362 of this system 100 and connecting the camera server 110a:

<embed src="camera1.wvp"width=480 height=320>

Step S403:
The Web browser program 361 accesses the WWW server 150 and downloads a data file ("camera1.wvp" file) designated by the embed tag.

Step S404:
The Web browser program 361 activates the program corresponding to the identifier of the data file designated by the embed tag, i.e., activates the viewer program 362 of this system 100.

Step S405:
Upon activation of the viewer program 362 at Step S404, the data file downloaded at Step S403 is read. The data file contains an address and a connection port of the video server 252 constituting the camera server 110a. In accordance with the address and connection port, the video server 252 is accessed.

Step S411:
A program to be executed for the operation after the access at Step S405 is activated (a thread or a process is activated) to receive video data from the video server 252 each time the video data is transmitted and to display it in the video display area 363 made by the viewer program 362. This operation is repeated.

Step S406:
Upon activation of the viewer program 362 at Step S404, the data file downloaded at Step S403 is read. The data file contains an address and a connection port of the camera control server 251 constituting the camera server 110a. In accordance with the address and connection port, the camera control server 251 is accessed.

At this time, the connection identifier extracting unit 353 extracts the connection identifier for identifying a connection to the camera control server 251.

Step S407:
In the process after Step S406, a user request is received from the viewer 120a, upon entering necessary information from the operation area 364 made by the viewer program 362 by using the keyboard 312 and mouse 313. Depending upon the user request, one of the following Steps 408, 409 and 410 is executed.

Step S408:
If the user request is associated with the operation control of the camera 111a, a command corresponding to the camera operation control is issued to the camera control server 251.

Step S409:
If the user request is associated with a delivery of video data picked up with the camera, a command corresponding to such an effect is issued to the video server 252.

Step S410:
If the user request is associated with a change in the viewer state (e.g., a change in the display size by the viewer program 362), the viewer state is changed correspondingly.

If the viewer request is associated with the termination of this process, programs regarding the viewer operation are sequentially terminated.

After these Steps S408 to S410 are completed, the flow returns to Step S407 to wait for the next user request.

With the above processes, a user of the client machine 120a can receive limited quality services (trial connection). If the user wishes to receive unlimited high quality services, the user is requested to perform the following operation, independently from the transmission/reception operation of the video data and various command relative to the camera server 110a. Namely, by using the connection identifier acquired at Step S406, a predetermined fee is paid to the charging server 140 and the connection identifier is transmitted back to the camera server 110a.

Figure 9:
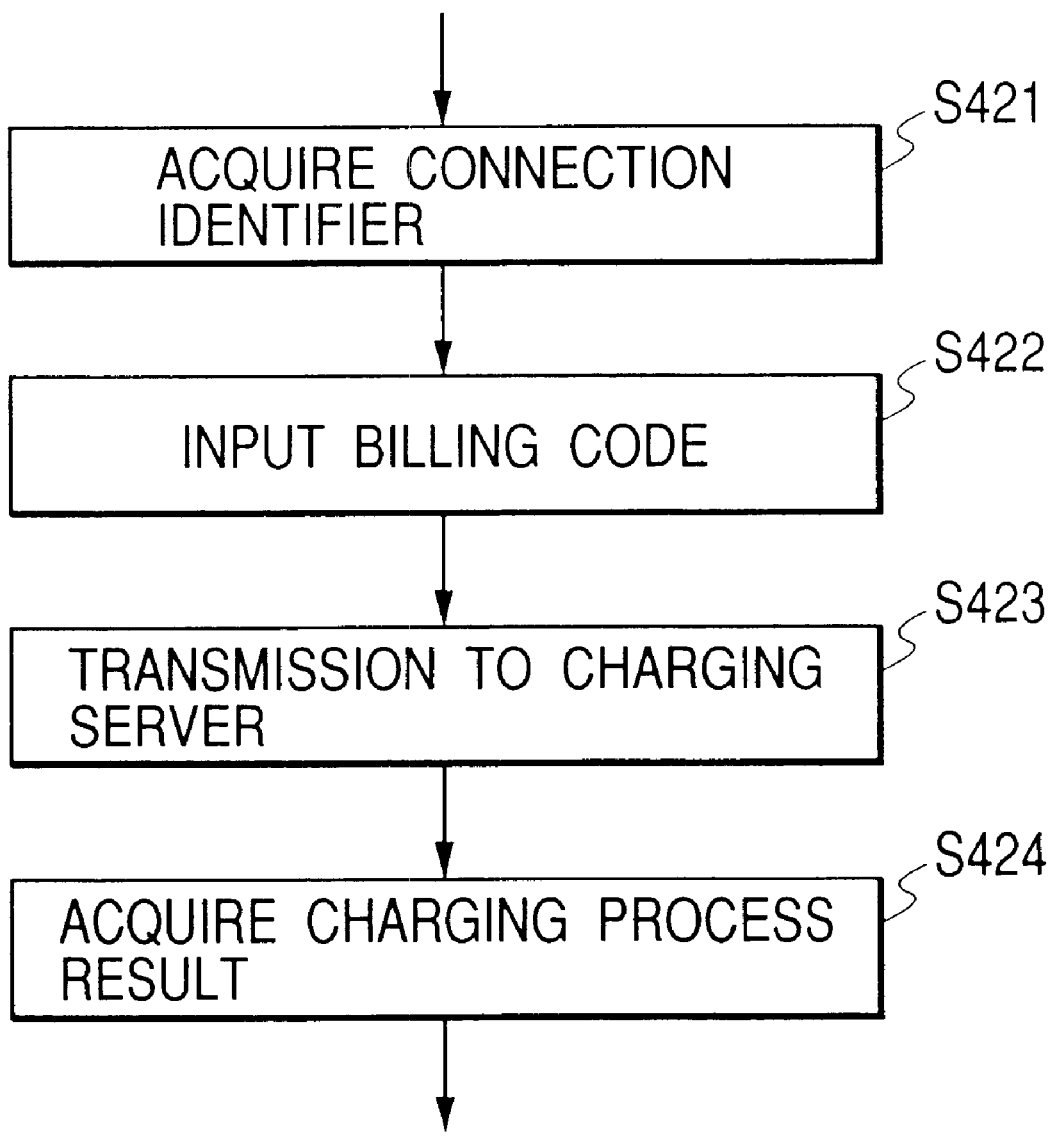
FIG. 9 is a flow chart illustrating the transmission/reception operation for a charging code and a connection identifier at the client machine.

The client machine 120a executes therefore the process illustrated in the flow chart of FIG. 9.

First, the connection identifier extracted by the connection identifier extracting unit 353 (and stored in a memory used by the viewer program 362) is read (Step S421).

Next, by using the keyboard 312 and mouse 313 of the client machine 120a of the user, the charging server 140 is accessed and a specific code (hereinafter called a "charging code") necessary for the charging operation is entered (Step S422).

Since the charging server 140 uses "BitCash", a charging code constituted of sixteen kana characters predefined by the "BitCash" system, is entered.

Next, the connection identifier read at Step S421 and the charging code entered at Step S422 are transmitted to the charging server 140 (Step S423).

This data transmission to the "BitCash" charging server 140 is stipulated by the system, as embedding each necessary data in the HTML format and transmitting through a POST method of HTTP (Hyper Text Transfer Protocol).

A charging process result is received from the charging server (Step S424).

If the charging is failed, a message of a charging failure is displayed on the display 121a, whereas if the charging succeeds, a message of a charging success is displayed on the display 121a.

Figure 10:
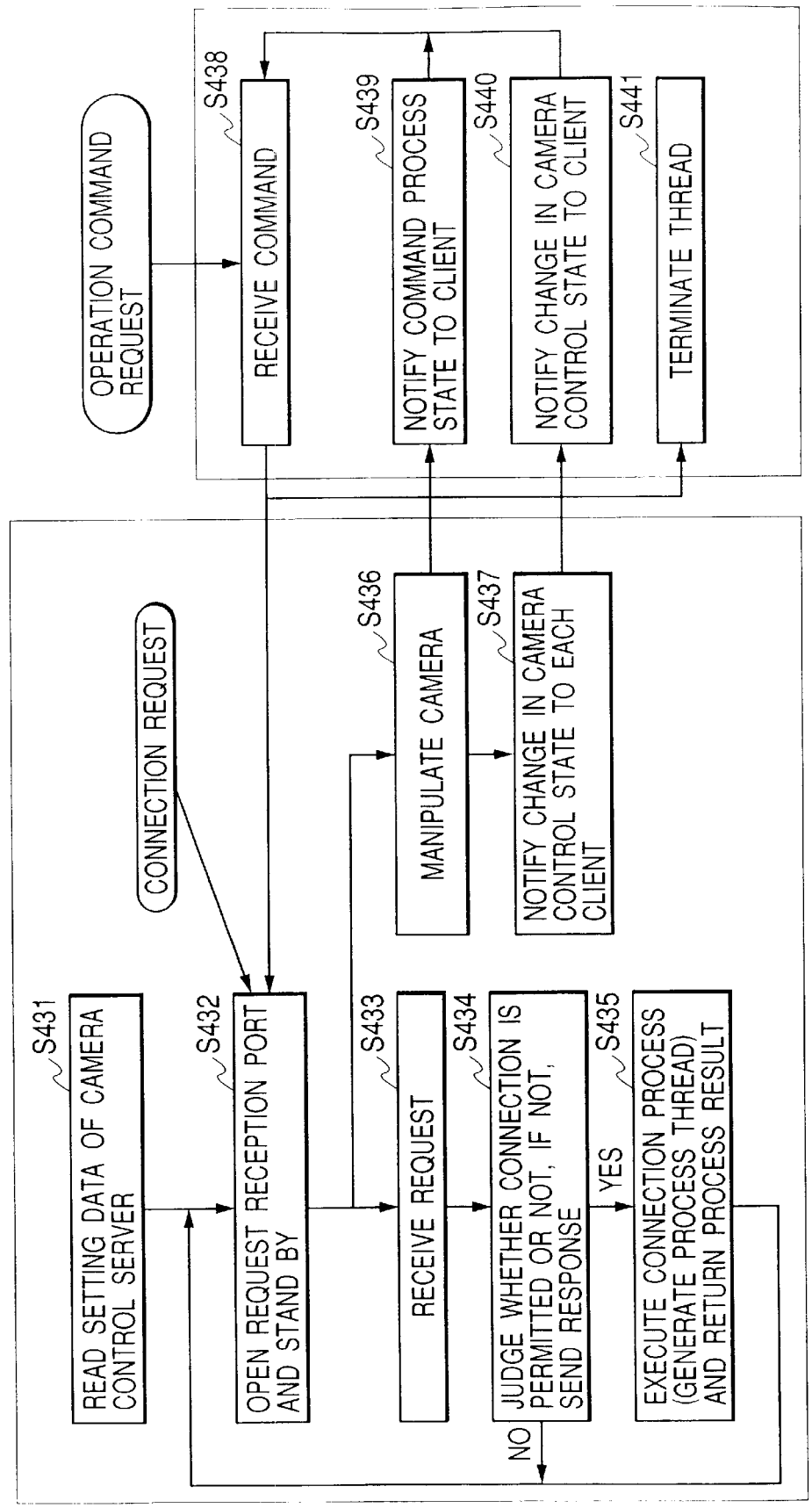
FIG. 10 is a flow chart illustrating the operation of a camera control server of the camera server.

FIG. 10 is a flow chart illustrating the operation to be executed by the camera control server 251 of the camera server 110a.

Step S431:

First, the operation starts in accordance with the operation setting information of the camera control server 251 read from a special file (e.g., a system database such as a registry depending upon the type of an OS) written by the camera server setting program illustrated in FIG. 4.

Step S432:

Ports for receiving requests from the client machines 120a, 120b, 120c, . . . are opened to enter a request reception state.

Step S433:

A request (connection request or operation command request) is received from a certain client machine (in this case, client machine 120a).

Step S434:

If the request at Step S433 is a connection request, it is judged whether the connection is permitted or not. If not, an error code representative of "connection rejected" is returned to the requested client machine 120a to thereafter return to Step S432.

Step S435:

If the request at Step S433 is a connection request and it is judged that the connection is permitted, then a connection process to the client machine is performed. Namely, a thread necessary for a process of receiving a command from the client machine 120a is generated, information on the client machine 120a is registered, and a connection identifier is allocated and transmitted to the client machine 120a. Thereafter, the flow returns to Step S432 to enter the request reception state.

Step S438:

By using the thread generated at Step S434, a command from the corresponding client machine 120a is waited for.

When a command from the client machine 120a reaches, the command is received and passed to the main program (hereinafter called a "camera operation program") for operating the camera 111a.

Step S436:

Upon reception of the command at Step S438, if the command is a command for operating the camera 111a (hereinafter called an "operation command"), the camera operation program runs to operate the camera 111a.

Step S439:

The camera operation program notifies the camera operation result (a code representative of a camera operation success or failure or the like) at Step S436 to the thread corresponding to the client machine 120a which issued the operation command of the camera 111a. This thread transmits the camera operation result to the client machine 120a. Thereafter, the flow returns to Step S438 to enter the command reception state.

Steps S437 and S440:

The camera operation program notifies a change state (e.g., a value of panning, tilting, zooming or the like) caused by the camera operation at Step S436 to the threads corresponding to all client machines 120a, 120b, 120c, . . . These threads transmit the change state of the camera 111a to all client machines 120a, 120b, 120c, . . . .

Step S441:

If the command received at Step S438 is a connection termination command, the camera operation program passes the command to the main program to thereafter terminate the subject thread.

The command reception process at Step S438 is executed reflecting the current service quality (either low or high quality services) of the corresponding client machine. Namely, if the service quality variable corresponding to the connection identifier of the client machine has a value (e.g., "0"),indicating the low quality connection (low quality services), service limiting means is used prior to passing the operation command of the camera 111a to the camera operation program.

If an operation command requesting a zoom operation is received from the connected client machine judged as the low quality connection, the service limiting means neglects the operation command and does not pass it to the camera operation program.

In dealing with the operation command, a camera operation privilege may be requested prior to issuing the operation command. In this case, a congested state can be avoided such as that a plurality of users (users of a plurality of client machines 120a, 120b, 120c, . . . ) request the camera operation of one camera 111a of the camera server 110a.

More specifically, if the client machines 120a, 120b, 120c, . . . issue commands for requesting the camera operation privilege, the camera control server 251 of the camera server 110a selectively return "rejection", "permission" and "standby" among the current assignment state of camera operation privileges to the client machines 120a, 120b, 120c, . . . .

The camera operation privilege is deprived after a lapse of a shorter time of either a predetermined time or a time when the connection of the client machine acquired the camera operation privilege is released, and thereafter, the camera operation privilege is assigned to the next standby client machine. The number of standby client machines is limited to a predetermined number (e.g., five machines), and the commands for requesting the camera operation privilege greater in number than five are rejected. The client machine can issue the operation command during the period from when the camera operation privilege is acquired to when it is deprived. The camera control server 251 receives the operation command only from the client machine acquired the camera operation privilege.

Figure 11:
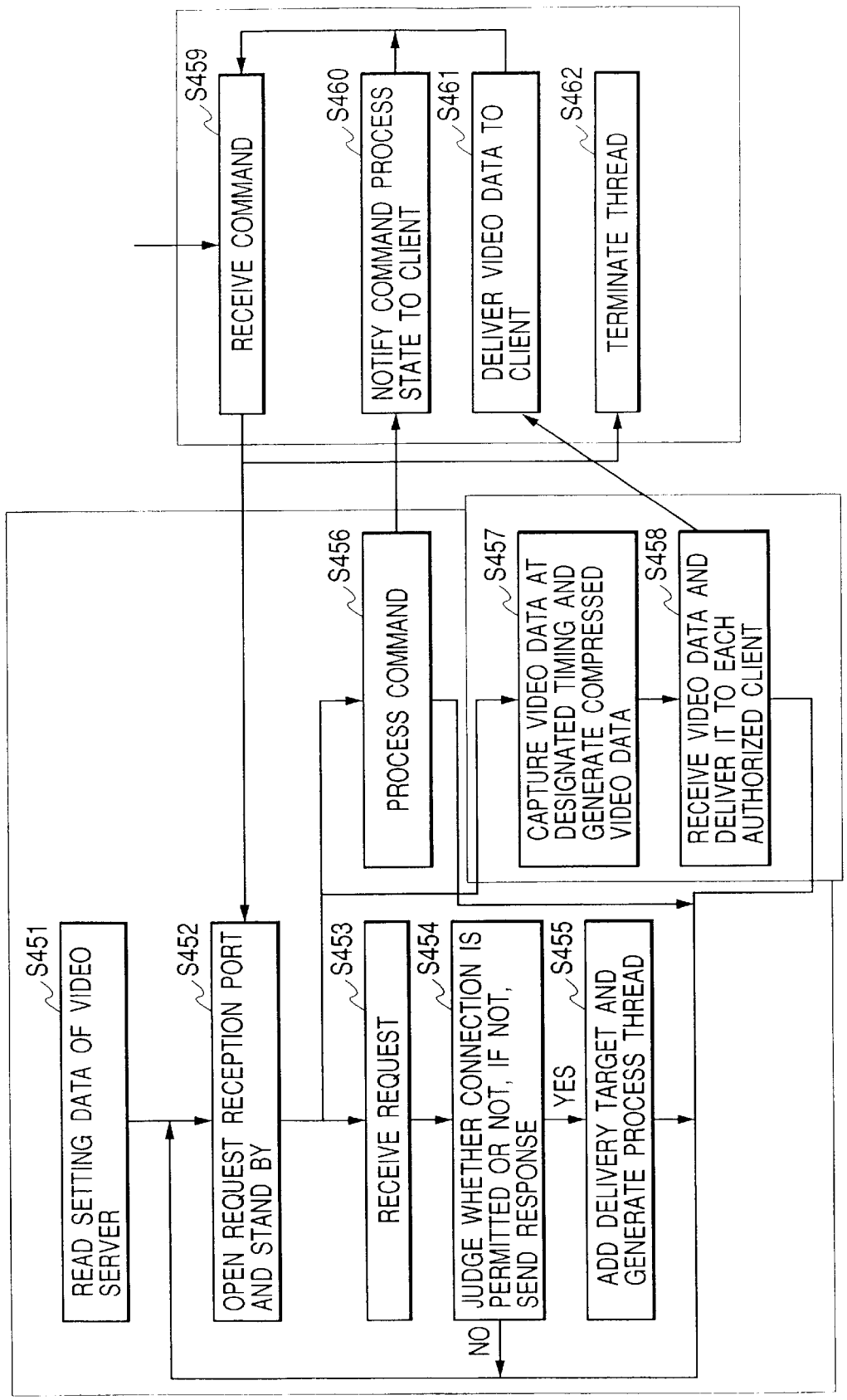
FIG. 11 is a flow chart illustrating the operation of a video server of the camera server.

FIG. 11 is a flow chart illustrating the operation to be executed by the video server 252 of the camera server 110a.

Step S451:

First, the operation starts in accordance with the operation setting information of the camera control server 251 read from the special file (e.g., a system database such as a registry depending upon the type of an OS) written by the camera server setting program illustrated in FIG. 4.

At this time, a thread for acquiring and coding video data taken with the camera 111a is generated. This thread is in a halt state at this time.

Step S452:

Ports for receiving requests from the client machines 120a, 120b, 120c, . . . are opened to enter a request reception state.

Step S453:

A request (connection request or operation command request) is received from a certain client machine (in this case, client machine 120a).

Step S454:

If the request at Step S453 is a connection request, it is judged whether the connection is permitted or not. If not, an error code representative of "connection rejected" is returned to the requested client machine 120a to thereafter return to Step S452 to enter the request reception state.

Step S455:

If the request at Step S453 is a connection request and it is judged that the connection is permitted, then a connection process to the client machine is performed. Namely, a thread necessary for a process of receiving a command from the client machine 120a is generated, and information on the client machine 120a is registered. Thereafter, the flow returns to Step S432 to enter the request reception state.

In this case, if the thread for acquiring and coding video data, generated at Step S451, is in the halt state, the thread is instructed to start operating to thereafter return to Step S452.

Step S459:

By using the thread generated at Step S455, a command from the corresponding client machine 120a is waited for.

When a command from the client machine 120a reaches, the command is accepted and passed to the main program (hereinafter called a "video process program") for performing a video process.

Steps S456 and S460:

Upon reception of the command at Step S459 (Step S456), if the command is a command for operating the camera 111a, in accordance with this command, settings for acquiring, coding and transmitting the video data are changed. The video process program notifies the setting change result (a code representative of a setting change success or failure or the like) to the thread corresponding to the client machine 120a which issued the operation command for the camera 111a. This thread transmits the setting change result to the client machine 120a (Step S460).

Thereafter, the flow returns to Step S459 to enter the command reception state.

Steps S457:

After the thread for acquiring and coding video data is instructed to start operating at Step S455, the video process program acquires video data taken with the camera at a predetermined time interval by using the video capturing board, and converts the video data into compressed video data.

Steps S458, S461, S462:

The video process program transfers the compressed video data generated at Step S457 to the threads corresponding to all client machines 120a, 120b, 120c. . . Each of the threads corresponding to the client machines 120a, 120b, 120c, . . . checks whether a next video frame transmission request is issued from the corresponding client machine, and if the request is issued, transmits the compressed data to the client machine.

Thereafter, the flow returns to Step S459 to enter the command reception state.

When the thread for each client machine receives the next video frame transmission request (e.g., a command returned in response to a reception completion of the compressed video data at the client machine) from the client machine, the thread sets a flag representative of a video frame transmission request. When the thread receives the connection termination command from the client machine, this effect is notified to the video process program and the subject thread is terminated (Step S462).

Figure 12:
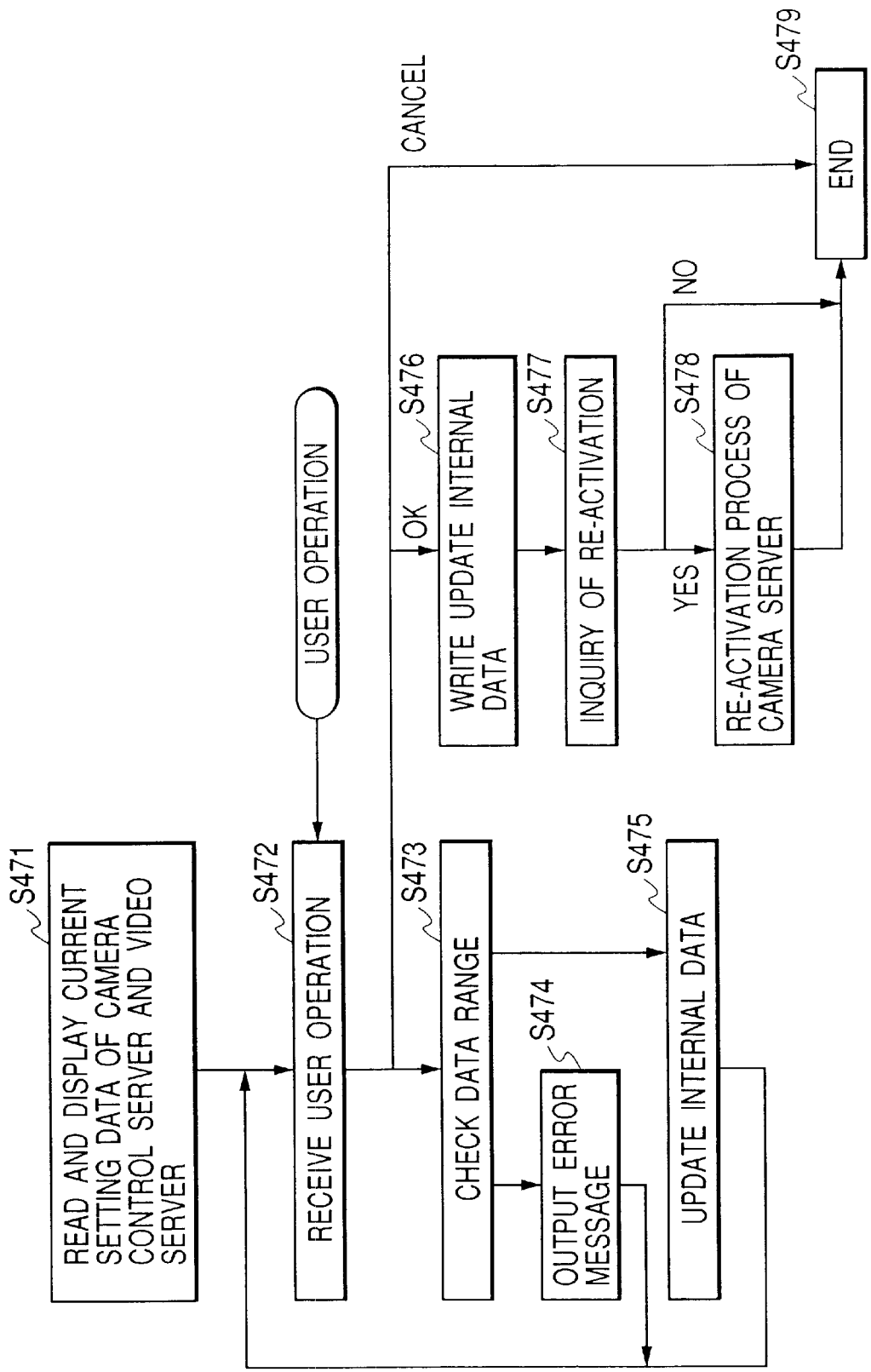
FIG. 12 is a flow chart illustrating the operation of setting operation information of the camera server.

FIG. 12 is a flow chart illustrating the operation to be executed by the camera server setting program of the camera server 110a illustrated in FIG. 4, i.e., by the program for writing operation setting information in the special file (refer to Step S431 shown in FIG. 10 and Step S451 shown in FIG. 11) which information is read by the camera control server 251 and video server 252.

Step S471:

When this program is activated, the setting information for the camera control server 251 and video server 252 is read from the special file (e.g., a system database such as a registry, depending upon an OS), and loaded in an internal memory.

Step S472:

A user operation at the camera server 110a is waited for, and when the user operation is entered, it is received.

Step S473:

It is checked whether the value entered at Step S472 is in a proper range.

Step S474:

If it is judged at Step S473 that the value is not proper, an error message to this effect is output to the display 211 and the entered value is changed to the original value.

Thereafter, the flow returns to Step S472 to wait for the next user operation.

Step S475:

If it is judged at Step S473 that the value of the user operation is proper, the corresponding internal value loaded at Step S471 is updated to the user operation value.

Thereafter, the flow returns to Step S472 to wait for the next user operation.

The values capable of being entered include the following items: a TCP port number for camera control communication; a COM (serial) port number for connection to a camera; a shutter speed; a presence/absence of log information on camera control and a log file name; a TCP port number for video communication; a presence/absence of log information and a log file name; a frame rate defining a video capturing time interval and a Q-Factor determining a compression quality; a frame size of original video data before compression; a longest connection time per client machine; the number of client machines waiting for the camera operation privilege; a permitted time for acquiring the camera operation privilege per client machine; the maximum number of client machines accessible to video services and camera control services; and the like.

Step S476:

If the user operation at Step S472 corresponds to the "OK" button, the internal data updated at Step S475 is written in the special file which stores the setting information for the camera control server 251 and video server 252.

Step S477:

A window is displayed on the display 211, the window being used for inquiring whether the camera server 110a is re-activated in order to reflect the data updated at Step S476.

Steps S478 and S479:

If the user instructs from the window displayed at Step S477 to re-activate the camera server 110a, then the camera control server 251, video server 251 and the like are re-activated (Step S478) to thereafter terminate this program (Step S479).

Step S479:

If the user instructs from the window displayed at Step S477 not to re-activate the camera server 110a, then this program is terminated.

If the user operation at Step S472 corresponds to the "CANCEL" button, the program is terminated.

Figure 13:
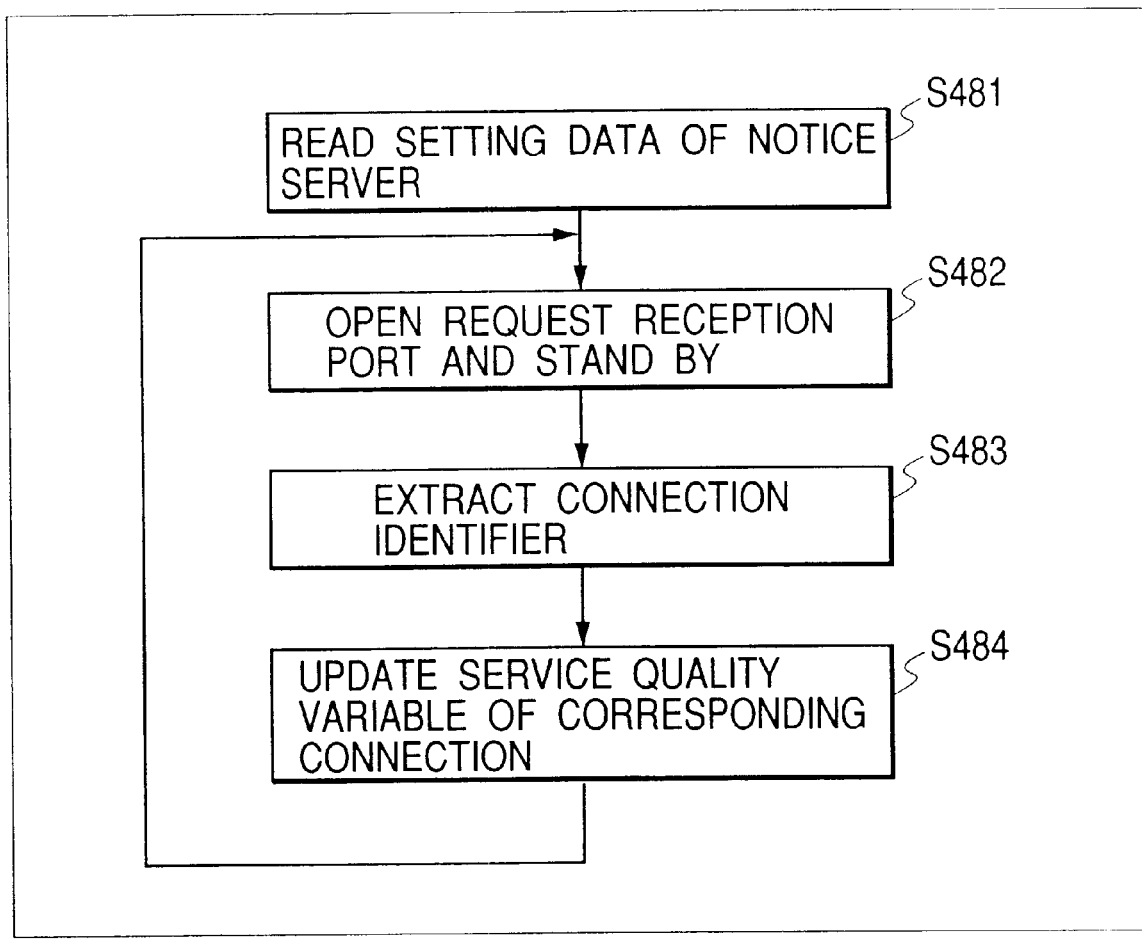
FIG. 13 is a flow chart illustrating the operation of a notice server of the camera server.

FIG. 13 is a flow chart illustrating the operation to be executed by the notice server 253 of the camera server 110a.

This notice server 253 receives the connection identifier transmitted from the client machine 120a via the charging server 140, and supplies it to the camera control server 251.

Step S481:

First, the operation starts in accordance with the operation setting information of the notice server 253 read from a special file (e.g., a system database such as a registry depending upon the type of an OS).

Step S482:

A port for receiving a request from the charging server 140 as a client is opened to enter a request reception state.

The request reception port is opened on the private circuit between the charging server 140 and camera server 110a. Namely, this private circuit is different from the communication route for the video services and camera control services.

Step S483:

When a request is received at Step S482, the connection identifier contained in the request is extracted. In this example, the request received at the port is assumed to be a request with the connection identifier for releasing the service limitation.

Step S484:

The service quality variable corresponding to the connection identifier extracted at Step S483 is changed to the value (e.g., "1") indicating the high quality connection.

Thereafter, the flow returns to Step S481 to enter the request reception state.

As described above, according to the embodiment, the camera server 110a provides the client machine 120a with services (trial services) by limiting the contents thereof in accordance with the connection identifier acquired when the client machine 120a is connected to the camera server 110a. When the connection identifier is received from the charging server 140 via the route different from the route for the video services and camera control services, in accordance with this connection identifier, the camera server 110a provides the client machine 120a with high quality services without the service limitation. This connection identifier used for releasing the service limitation (i.e., an identifier indicating that the fee has already been paid) is acquired after the client machine 120a transmits a charging code for paying a predetermined fee to the charging server 140.

With the above embodiment configuration, it is not necessary to issue and manage key information to be used for releasing service limitation, as in the conventional system. Therefore, the system can be simplified and the cost can be reduced.

In this embodiment, although the camera control server 251 of the camera server 110a issues the connection identifier when the client machine 110a is connected, the connection identifier may be issued in a different manner.

For example, the video server 252 of the camera server 110a may issue the connection identifier in accordance with the type of services with service limitation. In this case, if the video server 251 can selectively provide images of a plurality of different sizes in response to a request from the client machine, image of a large size can be provided as high quality services. Instead of different sizes, different frame rates may also be used.

Both the video server 252 and camera control server 251 may issue independently the connection identifier. In this case, the types of chargeable services may be selectively determined to provide the client machine 110a with limited services.

The connection identifier may be shared by the video server 252 and camera control server 251 to simplify the management of clients.

In this embodiment, as the variable (service quality variable) indicating the service quality contained in the connection identifier, the value "1" indicating high quality services and the value "0" indicating low quality services, i.e., binary values, are used. Instead, multi-value service quality values may also be used to manage services at multi-levels.

In this embodiment, the camera control server 251 invalidates the zoom operation as the trial service limitation. Other operations may also be limited. For example, an access time, a control range such as panning and tilting, or the like may also be limited.

Similarly, the service limitation may be made by the video server. For example, an image quality, a frame rate, an image size or the like may also be limited.

In this embodiment, only the limitation of using the camera control function has been described. Other controls may also be used. For example, in the chargeable services of the camera server 110a, video data to be supplied to the client machine 120a may be enciphered to make it hard to illegally receive the video data during communications. It is therefore possible to avoid any disadvantages on the side of charged users. Similarly, in the communications of transferring the connection identifier, the connection identifier may be enciphered to improve security.

Also in this embodiment, the private circuit is used for the connection to the charging server 140, in order to use a different route from the route for the camera control services and video services. Other lines may also be used so long as they can be discriminated from the route for the camera control services and video services. For example, two different network interfaces may be used, serial communications interfaces may be used, or a telephone line with a transmitter number notice function may be used.

(Second Embodiment)

Figure 14:
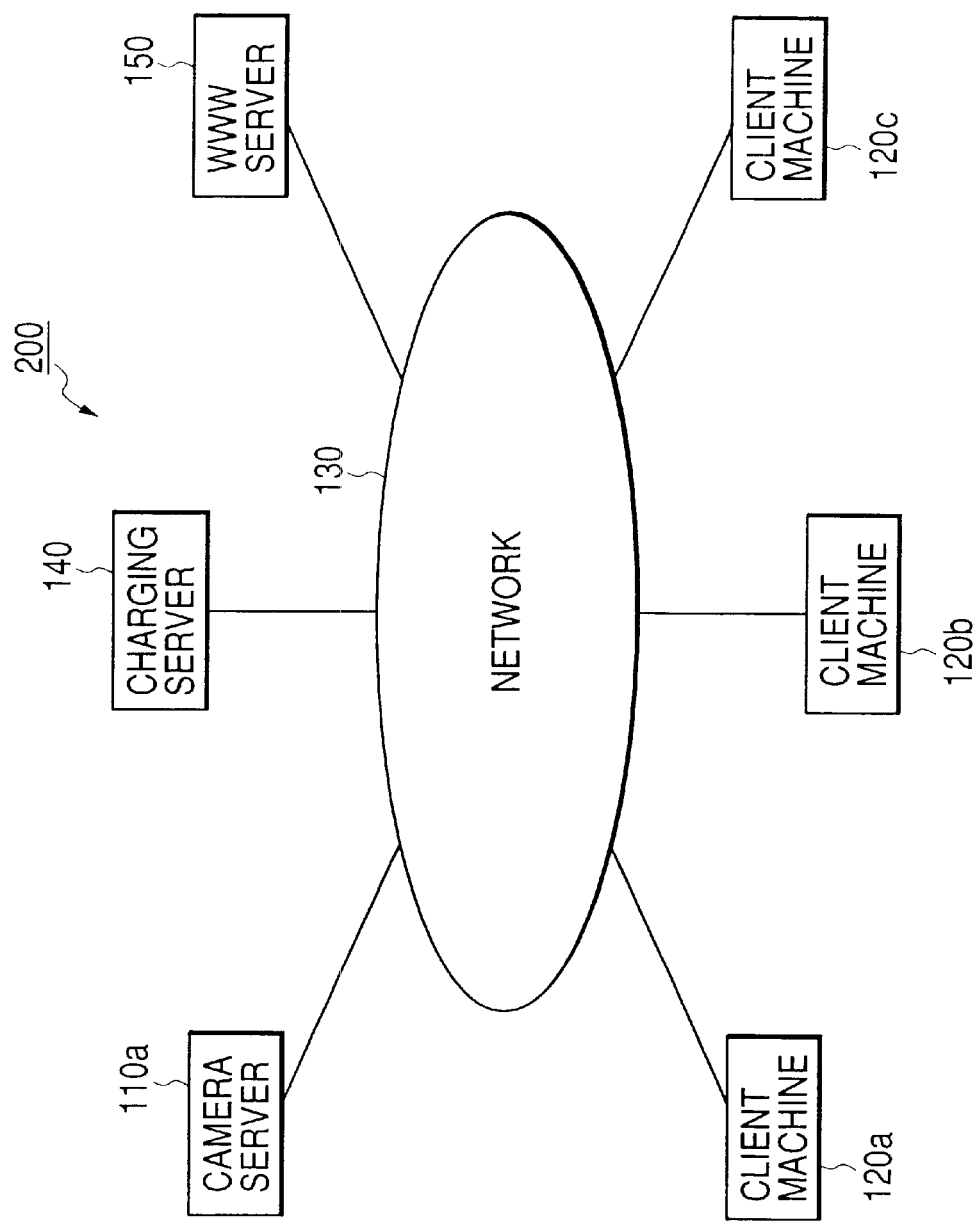
FIG. 14 is a block diagram showing a video transmission system with a camera control function according to a second embodiment of the invention.

In this embodiment, similar to the first embodiment, the connection identifier is transmitted from the charging server 140 via the communication route different from the route for the video services and camera control services. However, as shown in FIG. 14, in the second embodiment, as different from the first embodiment, the same physical connection medium as that used for the video services and camera control services is used.

Specifically, in the second embodiment, two logical routes are provided, one route for the transmission/reception for the video services and camera control services, and the other route for the transmission of the connection identifier (already charged connection identifier) from the charging server 140. Although these two logical routes share the same physical connection medium, communications by the computer (in this case, the charging server 140) having a special network address are processed differently in the camera server 110*a* to realize two different logical routes in a software manner.

In other words, the notice server 253 communicates only with the charging server 140 in order to realize a different route.

Figure 15:
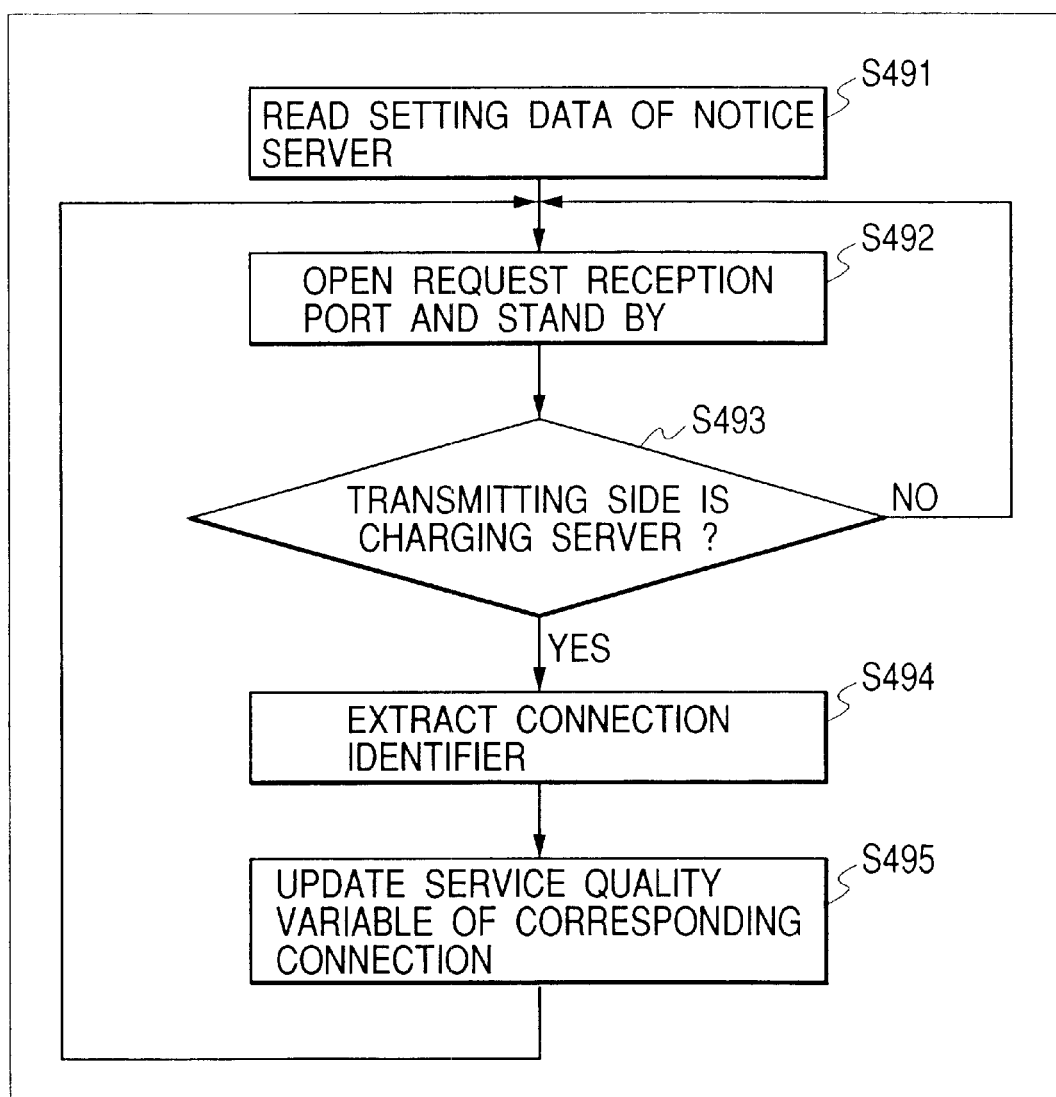
FIG. 15 is a flow chart illustrating the operation of a notice server of the system.

The operation to be executed by the notice server 253 of the camera server 110*a* in a system 200 according to the second embodiment is illustrated in the flow chart of FIG. 15.

Step S491:

The operation starts in accordance with operation setting information on the notice server 253 read from a special file (e.g., a system database such as a registry, depending upon an OS).

Step S492:

A port for receiving a request from the charging server 140 as a client is opened to enter a request reception state.

The request reception port is opened on the same connection medium as the medium for the video services and camera control services.

Step S493:

When a request is received at Step S492, the transmission side of the request is checked. In this example, the request received at the port is assumed to be a request with the connection identifier for releasing the service limitation.

If the transmission side is not the charging server 140, the flow returns to Step S492 to enter the request reception state.

A method of checking the transmission side of a request changes with the used communication protocol. For example, if the Internet is used, similar to packet filtering techniques widely used by many firewalls, the IP (Internet Protocol) address of the charging server 140 is registered in advance in the notice server 253, and compared to the transmission side IP address contained in the request to identify the transmission side.

Step S494:

If the transmission side of request is the charging server 140, the connection identifier contained in the request is extracted.

Step S495:

The service quality variable corresponding to the connection identifier extracted at Step S494 is changed to the value (e.g., "1") indicating the high quality connection.

Thereafter, the flow returns to Step S492 to enter the request reception state.

Also with this embodiment configuration, the system can be simplified and the cost can be reduced similar to the first embodiment.

It is obvious that the object of the invention can be achieved by supplying a system or apparatus with a storage medium storing software program codes realizing the functions of the host and terminal of each embodiment described above, and by reading and executing the programs codes stored in the storage medium by a computer (CPU or MPU) of the system and apparatus.

In such a case, the program codes themselves read from the storage medium realize the functions of each embodiment. Therefore, the storage medium storing such program codes constitutes the present invention.

The storage medium for storing such program codes may be a ROM, a floppy disk, a hard disk, an optical disk, a magneto optical disk, a CD-ROM, a CD-R, a magnetic tape, a nonvolatile memory card or the like.

It is obvious that the scope of the invention also contains not only the case wherein the functions of each embodiment can be realized by executing the program codes read by a computer, but also the case wherein the functions of each embodiment can be realized by executing a portion or the whole of processes by an OS running on the computer, in accordance with the program codes.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

As described so far, according to the embodiments, in the initial stage immediately after the connection between the service requested client and camera server, the client is provided with limited services (low quality services for trial), in accordance with the connection identifier issued to the client. If the client wishes to receive high quality services and returns the connection identifier issued from the server via the specific transmission side, the server provides the client identified by the connection identifier with the limitation relaxed (or released) high quality services, in accordance with the returned connection identifier.

With the embodiment configuration, it is not necessary to issue and manage key information (ticket information) to be used for releasing service limitation, as in the conventional system. Therefore, the system can be simplified and the cost can be reduced.

For example, in the video services with a chargeable camera control function running on a network, a special identifier (connection identifier) is transferred via a route different from the route for services such as video services and camera control services, trial services can be realized in a simple manner and the use of services can be promoted. The different route is used for the communications with the charging system (specific transmission side). Therefore, chargeable video services with a camera control function can be provided by using even a simple configuration.

What is claimed is:

1. An apparatus controlling system for providing a service requested client with services including an operation of the apparatus via a network, the apparatus control system comprising:

an output device adapted to output an identifier for identifying the client, to the apparatus;

a control device adapted to limit at a plurality of levels the services to be provided to the client in case of determining that the identifier is transmitted from the client who has not been charged, and to eliminate the limitation of the service prior to an operating command acquired by the apparatus, in case of determining that the identifier is transmitted from the client who has been charged; and an image pickup function with controllable orientation via the network that provides services to the client that include at least one of video data and control of the orientation acquired by the image pickup function.

2. A control method for providing a service requested client with services including an operation of an apparatus, the control method comprising:

an identifier issuing step in which the server issues an identifier for identifying the client, to the client;

an identifier transmitting step in which the client transmits the issued identifier to the server;

a service limiting step in which the server limits at a plurality of levels the services to be provided to the client in case of determining that the identifier is transmitted from the client who has not been charged; and a service quality changing step in which the server eliminates the limitation of the services prior to an operating command acquired by the server, in case of determining that the issued identifier is transmitted from the client who has been charged;

an image orientation step in which the server provides services to the client that include at least one of video data and control of the orientation acquire by a predetermine image pickup function.

3. A control method according to claim 2, wherein said identifier issuing step includes a step wherein the server executes an arbitration process if there is a plurality of service requested clients.

4. A control method according to claim 2, wherein said identifier issuing step includes a step wherein the server ciphers the identifier.

5. A control method according to claim 2, wherein said service quality changing step includes a step wherein the server receives the identifier from the client, in accordance with a packet attribute of data transmitted via the network.

6. A control method according to claim 5, wherein said service quality changing step includes a step wherein the server receives the identifier from the client, in accordance with an address of the predetermined transmission side contained in the packet attribute.

7. A control method according to claim 6, wherein said service quality changing step includes a step of registering in advance the address of the client in the server.

8. A control method according to claim 2, further comprising a step of transmitting the identifier to the sever via a route different from a communication route for providing the services.

9. A control method according to claim 2, wherein the identifier is transmitted via a charging server to charge the services.

10. A computer readable storage medium storing the steps of the control method recited in claim 2.

11. A computer readable storage medium storing the steps of the control method recited in claim 3.

12. A computer readable storage medium storing the steps of the control method recited in claim 4.

13. A computer readable storage medium storing the steps of the control method recited in claim 5.

14. A computer readable storage medium storing the steps of the control method recited in claim 6.

15. A computer readable storage medium storing the steps of the control method recited in claim 7.

16. A computer readable storage medium storing the steps of the control method recited in claim 8.

17. A computer readable storage medium storing the steps of the control method recited in claim 9.

18. An apparatus for performing to limit service including an operation of the apparatus, depending on a service requested client, the apparatus comprising:

means for limiting the services at a plurality of levels;

a receiving device adapted to receive an identifier for identifying the client;

a control device adapted to eliminate the limitation of the service prior to an operating command acquired by the apparatus, in case of determining that the identifier is transmitted from the client who has been charged; and an image pickup function with controllable orientation via the network that provides services to the client that include at least one of video data and control of the orientation acquired by the image pickup function.

19. The apparatus according to claim 18, wherein the apparatus includes a camera unit.

20. An computer storage readable medium for storing a program to control an apparatus for performing to limit service including an operation of the apparatus, depending on a service requested client, the program comprising the steps of:

limiting the services at a plurality of levels;

receiving an identifier for identifying the client;

eliminating the limitation of the service prior to an operating command being acquired by the apparatus, in case of determining that the identifier is transmitted from the client who has been charged; and providing an image pickup function with controllable orientation via the network that provides services to the client that include at least one of video data and control of the orientation acquired by the image pickup function.

21. The computer storage readable medium according to claim 20, wherein the apparats includes a camera unit.

22. A method of limiting service including an operation of an apparatus, depending on a service requested client, the method comprising:

limiting the services at a plurality of levels;

receiving an identifier for identifying the client;

eliminating the limitation of the service prior to an operating command acquired by the apparatus, in case of determining that the identifier is transmitted from the client who has been charged; and providing an image pickup function with controllable orientation via the network that provides services to the client that include at least one of video data and the control of the orientation acquired by the image pickup function.

23. A method according to claim 22, wherein the apparatus includes a camera unit.

24. An apparatus for performing to limit service including an operation of a device, depending on a service requested client, comprising:

a receiving device adapted to receive an identifier for identifying the client;

an image pickup device adapted to pick up an image and control a mechanical image pickup function on the basis of a command from the client; and a control device adapted to limit an operation of the mechanical image pickup function of the camera to be operated by the client in case of determining that the identifier is transmitted from the client who has not been charged, and to eliminate the limitation of the operation of the mechanical image pickup function prior to receiving the command for operating the image pickup function in case of determining that the identifier is transmitted from the client who has been charged.

25. The apparatus according to claim 24, wherein the control device performing service of transmitting an image to the client, even if the client has not been charged.

26. A method for limiting service including an operation of an image pickup device for picking up an image and controlling a mechanical image pickup function on the basis of a command from a service requested client, the method comprising the steps of:

receiving identifier for indentifying the service requested client;

limiting an operation of the mechanical image pickup function of the camera to be operated by the client in case of determining that the identifier is transmitted from the client who has not been charged; and eliminating the limitation of the operation of the mechanical image pickup function prior to receiving the command for operating the image pickup function in case of determining that the identifier is transmitted from the client who has been charged.

27. The method according to claim 26, wherein service of transmitting an image to the client is performed, even if the client has not been charged.

28. A computer storage readable medium for storing program to control of the apparatus for performing to limit service including an operation of a device, depending on a service requested client, the program comprising the steps of:

receiving identifier for indentifying the service requested client;

limiting an operation of the mechanical image pickup function of the camera to be operated by the client in case of determining that the identifier is transmitted from the client who has not been charged; and eliminating the limitation of the operation of the mechanical image pickup function prior to receiving the command for operating the image pickup function in case of determining that the identifier is transmitted from the client who has been charged.

29. The computer storage readable medium according to claim 28, wherein the service of transmitting an image to the client is performed, even if the client has not been charged.

* * * * *

UNITED STATES PATENT AND TRADEMARK OFFICE
CERTIFICATE OF CORRECTION

PATENT NO. : 6,772,191 B1
APPLICATION NO. : 09/438567
DATED : August 3, 2004
INVENTOR(S) : Takahiro Kurosawa et al.

It is certified that error appears in the above-identified patent and that said Letters Patent is hereby corrected as shown below:

In Item (56) on the Title Page, the following reference should be included:

--6,675,386 B1  *  1/2004 Hendricks et al.  725/105.--

Column 3, Line 46, change "quality:" to --quality;--.

Column 3, Line 49, change "services;" to --services);--.

Column 3, Line 59, change "patter" to --pattern--.

Column 5, Line 21, change "120c" to --120c, . . . .--.

Column 5, Line 33, change "121c" to --121c, . . . .--.

Column 6, Line 60, change "are." to --are--.

Column 10, Lines 45-46, change "(e.g., "0")indicating" to --(e.g., "0") indicating --.

Column 12, Line 15, change "120c" to --120c, . . . .--.

Column 16, Line 12, change "magneto optical" to --magnetooptical--.

Column 18, Line 20, change "An" to --A--.

Column 18, Line 38, change "apparats" to --apparatus--.

Column 18, Lines 50-51, change "and the control" to --and control--.

UNITED STATES PATENT AND TRADEMARK OFFICE
CERTIFICATE OF CORRECTION

PATENT NO. : 6,772,191 B1
APPLICATION NO. : 09/438567
DATED : August 3, 2004
INVENTOR(S) : Takahiro Kurosawa et al.

It is certified that error appears in the above-identified patent and that said Letters Patent is hereby corrected as shown below:

Column 20, Line 22, change "wherein the service" to --wherein service--.

Signed and Sealed this

Eleventh Day of December, 2007

JON W. DUDAS
*Director of the United States Patent and Trademark Office*